United States Patent
Chou et al.

(10) Patent No.: US 10,924,005 B2
(45) Date of Patent: Feb. 16, 2021

(54) SWITCHING-MODE POWER SUPPLIES AND POWER CONTROLLERS CAPABLE OF JITTERING SWITCHING FREQUENCY

(71) Applicant: Leadtrend Technology Corporation, Zhubei (TW)

(72) Inventors: Pao-Chu Chou, Zhubei (TW); Ming Chang Tsou, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 16/405,952

(22) Filed: May 7, 2019

(65) Prior Publication Data

US 2019/0348910 A1 Nov. 14, 2019

(30) Foreign Application Priority Data

May 14, 2018 (TW) ................................ 107116310

(51) Int. Cl.
*H02M 1/44* (2007.01)
(52) U.S. Cl.
CPC ...................................... *H02M 1/44* (2013.01)
(58) Field of Classification Search
CPC ........................ H02M 1/44; H02M 2001/0032
See application file for complete search history.

(56) References Cited

U.S. PATENT DOCUMENTS

| | | | |
|---|---|---|---|
| 9,450,478 B1* | 9/2016 | Djenguerian | H02M 1/088 |
| 2016/0268901 A1* | 9/2016 | Nishijima | H02M 1/44 |
| 2019/0222124 A1* | 7/2019 | Chen | H02M 1/15 |

* cited by examiner

*Primary Examiner* — Peter M Novak
(74) *Attorney, Agent, or Firm* — McClure, Qualey & Rodack, LLP

(57) ABSTRACT

A power controller provides a PWM signal to a power switch in response to a compensation signal to control the power switch, the compensation signal generated in response to an output voltage of a power converter. The power controller is configured to provide a maximum switching frequency limiting a switching frequency of the PWM signal. The power controller jitters the maximum switching frequency, making the maximum switching frequency have a first average switching frequency and a first variation ratio when the compensation signal is a first compensation value, and have a second average switching frequency and a second variation ratio when the compensation signal is a second compensation value. The first average switching frequency is higher than the second average switching frequency, and the second variation ratio is larger than the first variation ratio.

13 Claims, 8 Drawing Sheets

SWITCHING-MODE POWER SUPPLIES AND POWER CONTROLLERS CAPABLE OF JITTERING SWITCHING FREQUENCY

CROSS-REFERENCE TO RELATED APPLICATION

This application claims priority to and the benefit of Taiwan Application Series Number 107116310 filed on May 14, 2018, which is incorporated by reference in its entirety.

BACKGROUND

The present disclosure relates generally to a power converter and the power controller thereof, and more particularly to a power controller which jitters switching frequency to avoid electromagnetic interference (EMI).

A power converter is a need for almost every consumer electronic, to for example convert an alternating-current (AC) power of a power grid into a direct-current (DC) voltage or current power with specific ratings required by the core circuit of a consumer electronic. Due to its compact size and high conversion efficiency, a switching-mode power supply used as a power converter is popularly adapted in the art.

Most of power converters are requested to cause no EMI, meaning the electromagnetic wave radiated from a power converter is forbidden to influence the operation of other electronics nearby. For a switching-mode power supply, one way to make it free of EMI is to jitter the switching frequency of the switching-mode power supply. Jittering a frequency is to slightly vary the frequency while keeping the frequency within a predetermined variation range and making the average of the frequency a constant. In view of frequency spectrum, jittering the switching frequency of a switching-mode power supply spreads the radiation energy from the switching-mode power supply over the variation range, so the radiation energy at a specific frequency is reduced, and a nearby electronic sensitive to the radiation energy at the specific frequency might not be disturbed.

Some switching-mode power supplies are designed to perform valley switching in order to reduce switching loss and increase conversion efficiency. Valley switching makes a power switch turned ON about the time when the voltage across a conduction channel of the power switch is at about its minimum. Quasi-resonance (QR) mode, an operation mode for a switching-mode power supply, generally implements valley switching. QR mode, however, when operating to supply power for a certain load, could cause the switching frequency of a switching-mode power supply to locate at a single frequency or to toggle between only two frequencies, possibly inducing EMI issues.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

A power converter according to embodiments of the invention has a power controller, which provides PWM signal to control a power switch in response to a compensation signal generated by detecting an output voltage that the power converter provides to supply power to a load. The power controller provides a maximum switching frequency to limit a switching frequency of the PWM signal. The power controller jitters the maximum switching frequency, changing it within a variation range centered at an average switching frequency. In this specification, variation ratio represents the variation range divided by the average switching frequency. When the power controller reduces the average switching frequency in response to a change in the load, the variation range remains the same so the variation ratio increases.

According to an embodiment of the invention, the PWM signal defines an ON time and an OFF time of the power switch. When the compensation signal is a compensation value, the power controller jitters the maximum switching frequency and the ON time at the same time, making the maximum switching frequency decreased while making the ON time increased.

Figure 1:
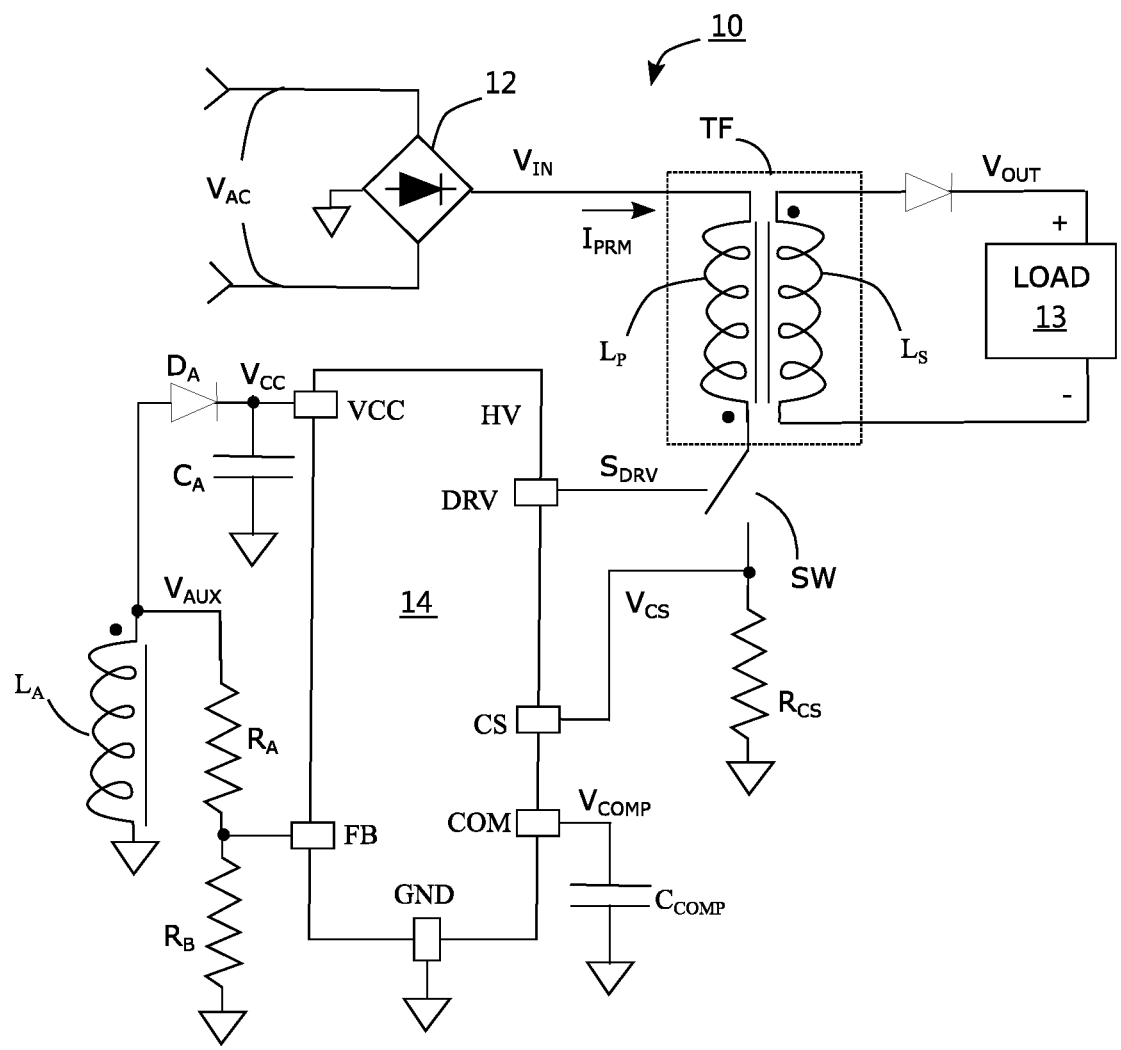
FIG. 1 demonstrates switching mode power converter 10 with a flyback topology.

FIG. 1 demonstrates switching mode power converter 10 with a flyback topology. Switching mode power converter 10 converts input voltage $V_{IN}$ into output voltage $V_{OUT}$ to supply power to load 13. Switching mode power converter 10 has bridge rectifier 12, power controller 14 and transformer TF, which, acting as an inductive device, includes primary winding $L_P$, auxiliary winding $L_A$ and secondary winding $L_S$, inductively coupled to each other.

Bridge rectifier 12 provides full-wave rectification to AC voltage $V_{AC}$ from a power grid and accordingly generates DC input voltage $V_{IN}$ and an input ground.

Primary winding $L_P$, power switch SW and current-sense resistor $R_{CS}$ are connected in series between input voltage $V_{IN}$ and the input ground. Power controller 14 provides PWM signal $S_{DRV}$ at driving node DRV to turn ON or OFF power switch SW, so either input voltage $V_{IN}$ magnetizes transformer TF, or transformer TF demagnetizes to provide current to output voltage $V_{OUT}$. Output voltage $V_{OUT}$, which is generated by rectifying the voltage drop across secondary winding $L_S$, provides power to load 13.

Via current-sense node CS, power controller 14 receives current-sense signal $V_{CS}$ capable of representing the current through current-sense resistor $R_{CS}$ or current $I_{PRM}$ flowing through primary winding $L_P$.

According to embodiments of the invention, switching mode power supply 10 employs primary side control (PSC), which implies that power controller 14 regulates output voltage $V_{OUT}$ solely relying on information at the primary side where AC voltage $V_{AC}$, input voltage $V_{IN}$ and the input ground locate. Resided at the secondary side, DC isolated from the primary side by transformer TF, are output voltage $V_{OUT}$ and load 13. Embodiments of the invention is not limited to PSC, however, and some embodiments of the invention might employ secondary side control (SSC). Taking as an example of SSC, the difference between output voltage $V_{OUT}$ and a target voltage is detected at the secondary side, and the detected result is transmitted through a photo coupler to power controller 14 at the primary side for regulation.

Power controller 14 of switching mode power supply 10 has feedback node FB, which is also the connection node between resistors $R_A$ and $R_B$, to detect voltage drop $V_{AUX}$ across auxiliary winding $L_A$.

Diode $D_A$ rectifies voltage drop $V_{AUX}$ to generate at power node VCC operating voltage $V_{CC}$, which provides power to power controller 14 for normal operation.

Figure 2:
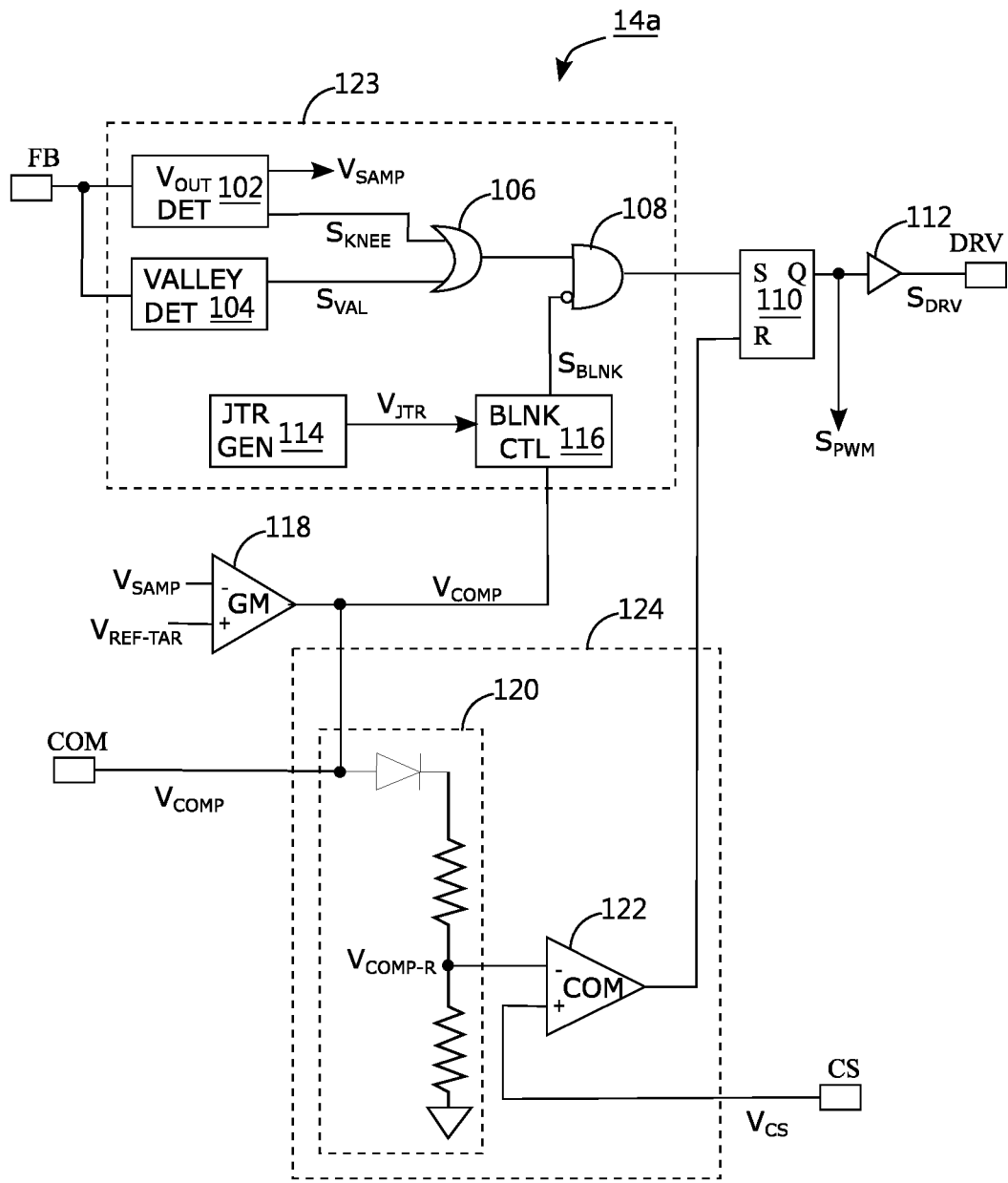
FIG. 2 shows power controller 14a as an embodiment of power controller 14 in FIG. 1.

Illustrated in FIG. 2 is power controller 14a as an embodiment of power controller 14 in FIG. 1. Power controller 14a could be a packaged integrated circuit having at least 4 pins respectively named as feedback node FB, driving node DRV, current-sense node CS, and compensation node COM. In power controller 14a are ON-time controller 124, OFF-time controller 123, transconductor 118, SR flip-flop 110, and driver 112.

Driver 112, receiving PWM signal $S_{PWM}$, is equipped with sufficient driving force to generate PWM signal $S_{DRV}$ controlling power switch SW. Simply put, in view of their logic value, PWM signal $S_{DRV}$ is substantially equivalent to PWM signal $S_{PWM}$, while PWM signal $S_{DRV}$ is majorly for external use and PWM signal $S_{PWM}$ for internal use of power controller 14a. In this specification, PWM signals $S_{PWM}$ and $S_{DRV}$ could replace with each other without causing any misunderstanding.

ON-time controller 124 determines the length of ON time $T_{ON}$ in response to compensation signal $V_{COMP}$ at compensation node COM, ON time $T_{ON}$ representing a period of time when power switch SW is kept as turned ON. If PWM signal $S_{DRV}$ is "1" in logic, power switch SW is turned ON, and current-sense signal $V_{CS}$ increases over time. Once current-sense signal $V_{CS}$ exceeds compensation signal $V_{COMP-R}$, which is generated by level shifter 120 in response to compensation signal $V_{COMP}$, comparator 122 resets SR flip-flop 110, making both PWM signals $S_{PWM}$ and $S_{DRV}$ "0" in logic to turn power switch SW OFF. Accordingly, ON-time controller concludes ON time $T_{ON}$ and starts OFF time $T_{OFF}$.

Figure 3A:
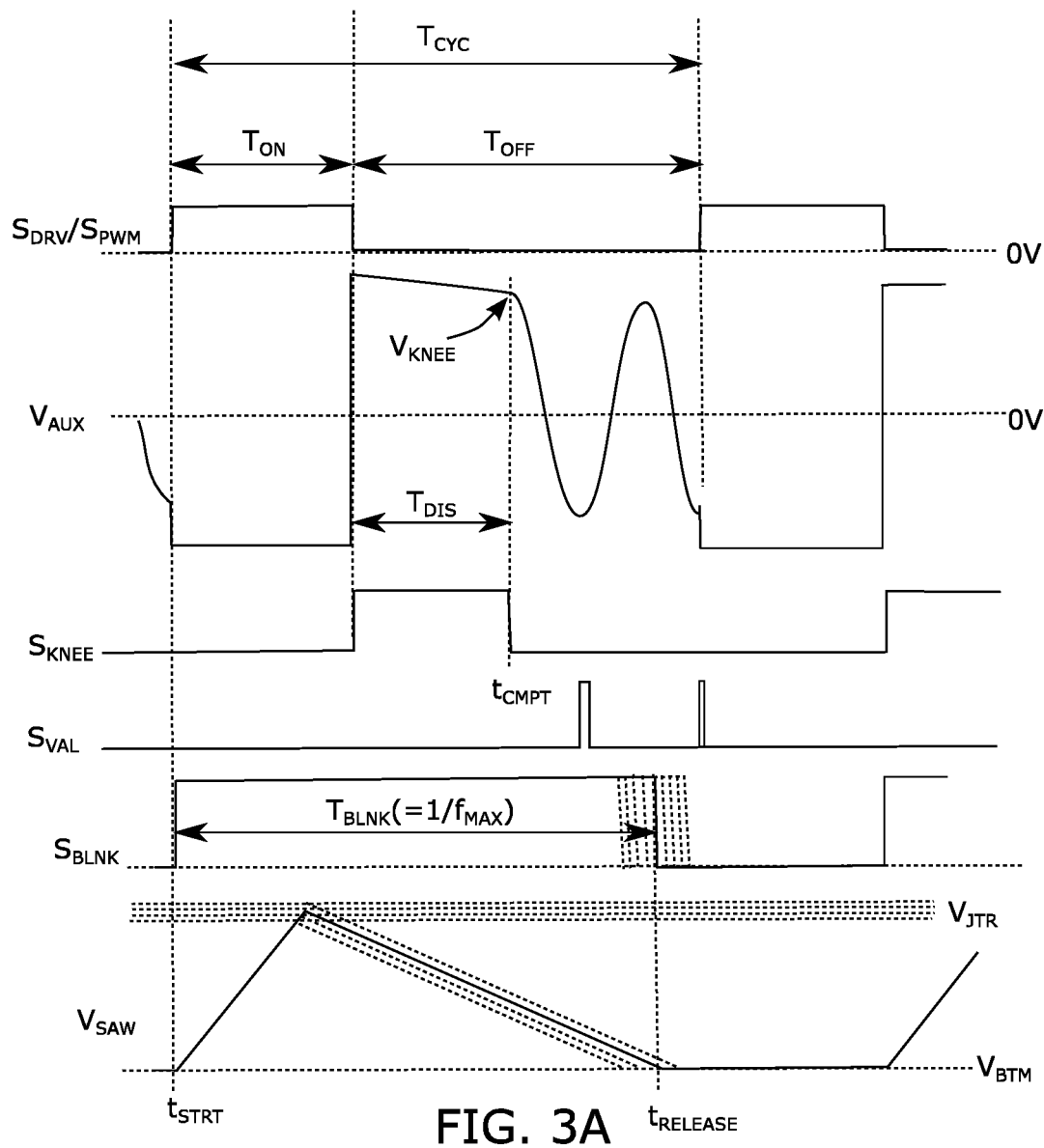
FIG. 3A shows waveforms of PWM signal $S_{DRV}$ or $S_{PWM}$, voltage drop $V_{AUX}$ across auxiliary winding $L_A$, and some signals inside OFF-time controller 123 of FIG. 2.

OFF-time controller 123 determines the length of OFF time $T_{OFF}$ in response to compensation signal $V_{COMP}$ at compensation node COM and the signal at feedback node FB, OFF time $T_{OFF}$ representing a period of time when power switch SW is kept as turned OFF. OFF-time controller 123 includes output voltage detector 102, valley detector 104, jitter generator 114, blanking time generator 116, OR gate 106, and AND gate 108, connection between which is shown in FIG. 2. FIG. 3A shows waveforms of PWM signal $S_{DRV}$ or $S_{PWM}$, voltage drop $V_{AUX}$ across auxiliary winding $L_A$, and some signals inside OFF-time controller 123 of FIG. 2.

Please refer to both FIGS. 2 and 3A. When ON time $T_{ON}$ ends and OFF time $T_{OFF}$ starts, voltage drop $V_{AUX}$ abruptly changes from a negative value into a positive value, and secondary winding $L_S$ starts demagnetizing.

Output voltage detector 102 detects moment $t_{CMPT}$ when voltage drop $V_{AUX}$ starts oscillation, and accordingly has pulse signal $S_{KNEE}$ turned from logic "1" into logic "0", as shown in FIG. 3A, where the pulse width of pulse signal $S_{KNEE}$, denoted as discharge time $T_{DIS}$, represents the period of time when secondary winding $L_S$ keeps demagnetizing. Output voltage detector 102 also samples the voltage at feedback node FB at about moment $t_{CMPT}$ to provide voltage sample $V_{SAMP}$, which somehow represents knee voltage $V_{KNEE}$ in FIG. 3A and/or output voltage $V_{OUT}$ in FIG. 1.

Transconductor 118 in FIG. 2 compares voltage sample $V_{SAMP}$ with predetermined reference voltage $V_{REF-TAR}$ to accordingly charge or discharge compensation capacitor $C_{COMP}$ connected to compensation node COM (in FIG. 1), so as to build up compensation signal $V_{COMP}$. When voltage sample $V_{SAMP}$ is below reference voltage $V_{REF-TAR}$, for example, transconductor 118 raises compensation signal $V_{COMP}$, and ON time $T_{ON}$ accordingly increases to extract more power from input voltage $V_{IN}$, so both output voltage $V_{OUT}$ and voltage sample $V_{SAMP}$, which is a representative of output voltage $V_{OUT}$, are expected to increase in a following switching cycle, thereby voltage sample $V_{SAMP}$ approaching reference voltage $V_{REF-TAR}$. Negative feedback control is accordingly constructed to make voltage sample $V_{SAMP}$ substantially equal to reference voltage $V_{REF-TAR}$. In other words, transconductor 118 generates compensation signal $V_{COMP}$ in response to output voltage $V_{OUT}$.

Valley detector 104 monitors whether voltage drop $V_{AUX}$ is entering a voltage valley, and if the entrance to a voltage valley is found it provides valley signal $S_{VAL}$ with a pulse. Valley detector 104, for example, detects whether the voltage at feedback node FB drops across 0V, and, if so, it correspondingly holds valley signal $S_{VAL}$ as logic "0" for a delay and then provides a pulse to valley signal $S_{VAL}$, as shown in FIG. 3A, which shows valley signal $S_{VAL}$ with two pulses corresponding to two voltage valleys in the waveform of voltage drop $V_{AUX}$. If anyone of the pulses of alley signal $S_{VAL}$ reaches and sets SR flip-flop 110, power switch SW performs valley switching.

Based on compensation signal $V_{COMP}$, blanking time generator 116 provides blanking signal $S_{BLNK}$, which defines blanking time $T_{BLNK}$. Connection of AND gate 108 makes OFF time $T_{OFF}$ end not earlier than the end of blanking time $T_{BLNK}$. In FIG. 3A, the pulse of blanking signal $S_{BLNK}$ lasts from time $t_{STRT}$ to time $t_{RELEASE}$, but this invention is not limited to. In another embodiment, the pulse of blanking signal $S_{BLNK}$ starts at the same time when OFF time $T_{OFF}$ starts, and ends at time $t_{RELEASE}$. Blanking time $T_{BLNK}$ for all embodiments of the invention, nevertheless, all refers to the period of time from time $t_{STRT}$ to time $t_{RELEASE}$. During blanking time $T_{BLNK}$, AND gate 108 blocks valley signal $S_{VAL}$ and pulse signal $S_{KNEE}$, keeping power switch SW OFF. After the end of blanking time $T_{BLNK}$, AND gate 108 allows valley signal $S_{VAL}$ and pulse signal $S_{KNEE}$ to pass through, and, if either valley signal $S_{VAL}$ or pulse signal $S_{KNEE}$ has "1" in logic, SR flip-flop 110 in FIG. 2 is set to make both PWM signals $S_{PWM}$ and $S_{DRV}$ "1" in logic, turning ON power switch SW, concluding OFF time $T_{OFF}$, and starting ON time $T_{ON}$. Therefore, OFF time $T_{OFF}$ does not end earlier than the end of blanking time $T_{BLNK}$. Cycle time $T_{CYC}$, equal to the combination of an ON time $T_{ON}$ and an OFF time $T_{OFF}$, is therefore not shorter than blanking time $T_{BLNK}$. From the view point of frequency domain, the switching frequency of PWM signal $S_{DRV}/S_{PWM}$ will be limited by blanking time generator 116 to be not more than the reciprocal of blanking time $T_{BLNK}$, where the reciprocal of blanking time $T_{BLNK}$ is therefore referred hereinafter to as maximum switching frequency $f_{MAX}$.

When time $t_{RELEASE}$ locates within discharge time $T_{DIS}$, power controller 14a operates switching mode power converter 10 in continuous conduction mode (CCM); when time $t_{RELEASE}$ locates behind the end of discharge time $T_{DIS}$ power controller 14a causes power switch SW to perform valley switching, or operates switching mode power converter 10 in QR mode. As demonstrated in FIG. 3A where time $t_{RELEASE}$ locates behind the end of discharge time $T_{DIS}$, power controller 14a makes next ON time $T_{ON}$ start at the time when the second voltage valley of drop voltage $V_{AUX}$ about happens.

Figure 3B:
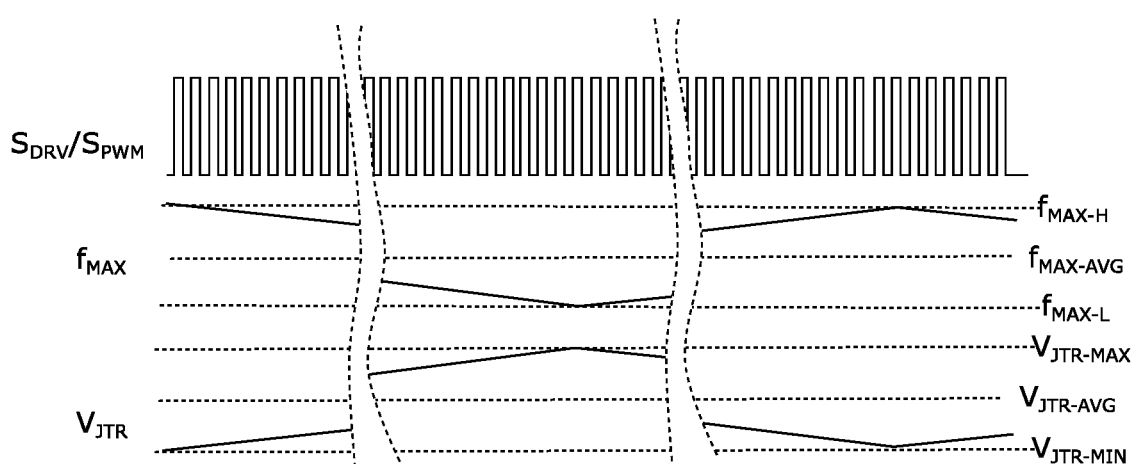
FIG. 3B shows PWM signal $S_{DRV}/S_{PWM}$, maximum switching frequency $f_{MAX}$, and jitter signal $V_{JTR}$.

Jittering generator 114 generates jitter signal $V_{JTR}$, providing it to blanking time generator 116 to jitter blanking time $T_{BLNK}$ or maximum switching frequency $f_{MAX}$. FIG. 3B shows PWM signal $S_{DRV}/S_{PWM}$, maximum switching frequency $f_{MAX}$, and jitter signal $V_{JTR}$. When compensation signal $V_{COMP}$ is about a constant value, jitter signal $V_{JTR}$ is a periodical triangular wave varying between voltages $V_{JTR-MAX}$ and $V_{JTR-MIN}$ and having an average voltage $V_{JTR-AVG}$. Meanwhile, jitter signal $V_{JTR}$ makes maximum switching frequency $f_{MAX}$ changed slowly between frequencies $f_{MAX-H}$ and $f_{MAX-L}$ and have an average switching frequency $f_{MAX-AVG}$, where frequency-variation range $f_{MAX-J}$ hereinafter represents frequency $f_{MAX-H}$ minus frequency $f_{MAX-L}$, and variation ratio RJ represents frequency-variation range $f_{MAX-J}$ divided by average switching frequency $f_{MAX-AVG}$. It is supposed, for example, that jittering signal $V_{JTR}$ changes slowly with a frequency of 400 HZ, average switching frequency $f_{MAX-AVG}$ is about 65 kHz, and frequencies $f_{MAX-H}$ and $f_{MAX-L}$ 66 kHz and 64 kHz. In the meantime, frequency-variation range $f_{MAX-J}$ is accordingly 2 kHz (=66 kHz-64 kHz) and variation ratio RJ 2/65. Shown in FIG. 3A, time $t_{RELEASE}$ jitters in accordance with jitter signal $V_{JTR}$, and so does blanking time $T_{BLNK}$.

Figure 4:
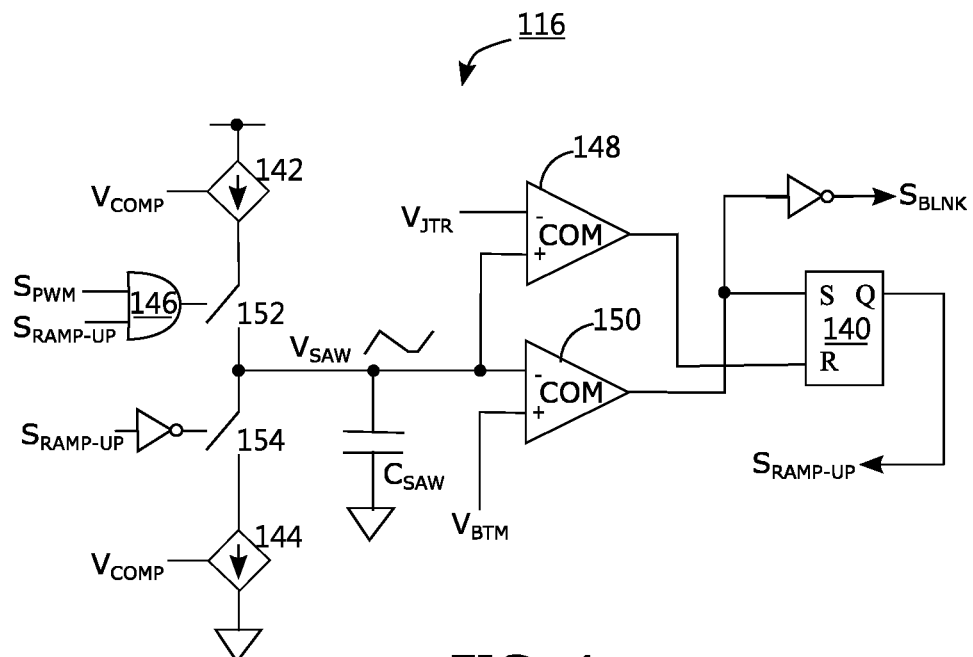
FIG. 4 demonstrates blanking time generator 116, acting as a saw-wave generator.

FIG. 4 demonstrates blanking time generator 116, acting as a saw-wave generator, and having controllable current sources 142 and 144, switches 152 and 154, AND gate 146, capacitor $C_{SAW}$, comparators 148 and 150, and SR flip-flop 150. Comparator 148 is configured to make saw-wave $V_{SAW}$ on capacitor $C_{SAW}$ not more than a ceiling voltage, which is jitter signal $V_{JTR}$ in FIG. 4. Comparator 150 is configured to make saw-wave $V_{SAW}$ not less than bottom voltage $V_{BTM}$. As the waveform of saw-wave $V_{SAW}$ shown in FIG. 3A, saw-wave $V_{SAW}$ has a maximum voltage about equal to jitter signal $V_{JTR}$ and a minimum voltage about equal to bottom voltage $V_{BTM}$. When jitter signal $V_{JTR}$ increases slightly, saw-wave $V_{SAW}$ reaches the value of bottom voltage $V_{BTM}$ slightly later than before, so blanking time $T_{BLNK}$ lengthens a little bit and maximum switching frequency $f_{MAX}$ decreases slightly.

Figure 5:
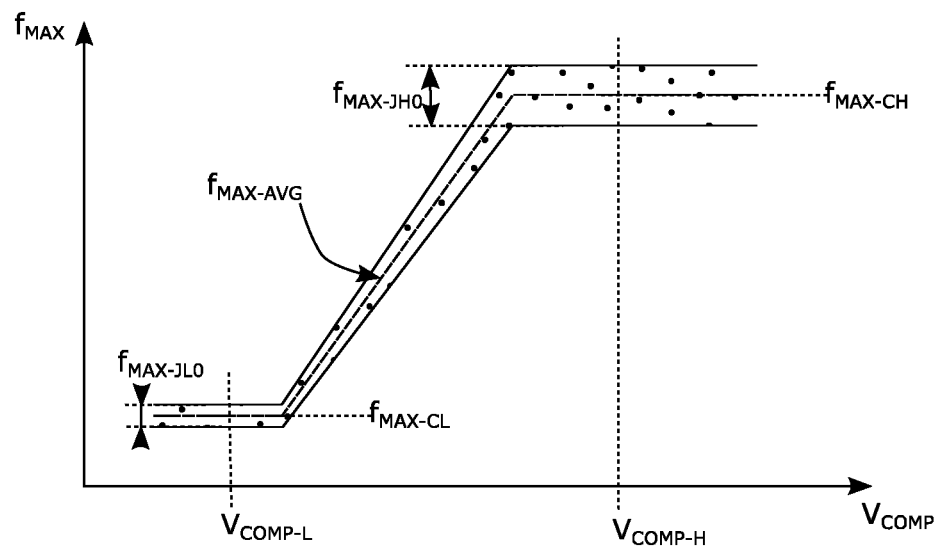
FIG. 5 shows the average switching frequency $f_{MAX\text{-}AVG}$ and frequency-variation range $f_{MAX\text{-}J}$ varying in response to compensation signal $V_{COMP}$.

In FIG. 4, both controllable current sources 142 and 144 are under the control of compensation signal $V_{COMP}$, to provide charge current to and discharge current from capacitor $C_{SAW}$, respectively. According to embodiments of the invention, controllable current sources 142 and 144 could be configured to make the average switching frequency $f_{MAX-AVG}$ and compensation signal $V_{COMP}$ have a relationship shown in FIG. 5. FIG. 5 shows that average switching frequency $f_{MAX-AVG}$ is $f_{MAX-CH}$, frequency-variation range $f_{MAX-J}$ $f_{MAX-JH0}$, variation ratio RJ $f_{MAX-JH0}/f_{MAX-CH}$, when compensation signal is equal to compensation value $V_{COMP-H}$. Also shown in FIG. 5 is that average switching frequency $f_{MAX-AVG}$ is $f_{MAX-CL}$, frequency-variation range $f_{MAX-J}$ $f_{MAX-JL0}$, variation ratio RJ $f_{MAX-JL0}/f_{MAX-CL}$, when compensation signal is equal to compensation value $V_{COMP-L}$. Compensation value $V_{COMP-H}$ and compensation value $V_{COMP-L}$ correspond to relatively-heavy and relatively-light loads 13 respectively.

It is derivable that variation ratio RJ caused by blanking time generator 116 in FIG. 4 is about a constant independent to the change in the value of compensation signal $V_{COMP}$. In other words, $f_{MAX-JH0}/f_{MAX-CH}$ in FIG. 5 is about the same with $f_{MAX-JL0}/f_{MAX-CL}$. Based on the waveform of saw-wave $V_{SAW}$ in FIG. 3A and blanking time generator 116 in FIG. 4, the equation I in the following can be derived.

$$I_M(V_{COMP})*T_{BLNK} = CSAW*2*(V_{JTR}-V_{BTM}) \quad (I),$$

where $I_M(V_{COMP})$ denotes the average current of controllable current sources 142 and 144, and CSAW the capacitance of capacitor $C_{SAW}$. Frequency-variation range $f_{MAX-J}$ can be expressed therefore by the equation II below.

$$f_{MAX-J} = f_{MAX-H} - f_{MAX-L} = (I_M(V_{COMP})/(CSAW*2))* \quad (II)$$
$$(1/(V_{JTR-MIN}-V_{BTM})-1/(V_{JTR-MAX}-V_{BTM})).$$

Variation ratio RJ can be expressed by the following equation III.

$$RJ = f_{MAX-J}/f_{MAX-AVG} = [1/(V_{JTR-MIN}-V_{BTM}) - \quad (III)$$
$$1/(V_{JTR-MAX}-V_{BTM})]*V_{JTR-AVG}.$$

Variation ratio RJ, as indicated by equation III, only depends on $V_{JTR-MIN}$, $V_{JTR-MAX}$, $V_{JTR-AVG}$, and $V_{BTM}$, all of which remain about constant inside jitter generator 114 and blanking time generator 116. Therefore, variation RJ provided by blanking time generator 116 is about a constant, independent from the change of compensation signal $V_{COMP}$.

Figure 6:
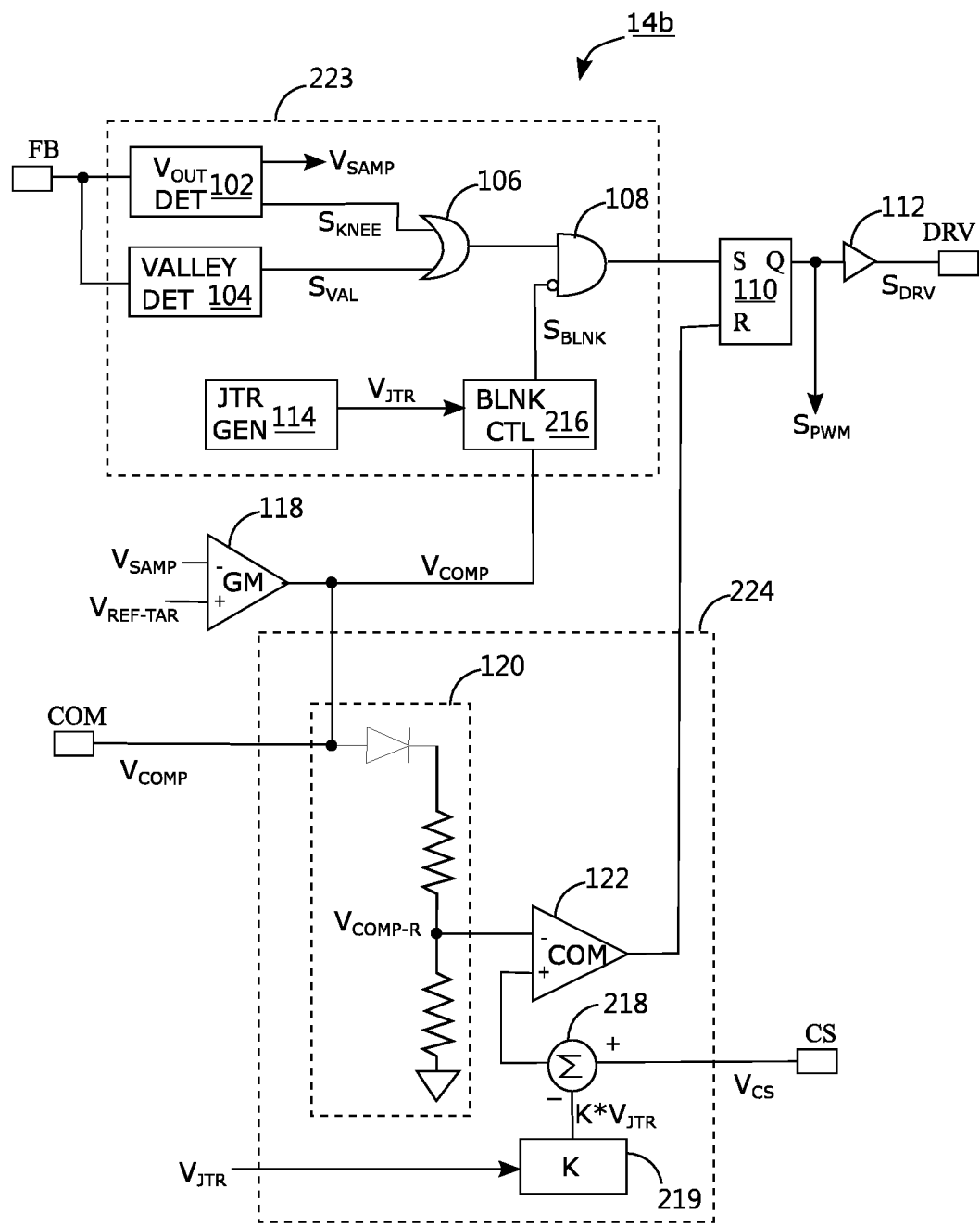
FIG. 6 shows power controller 14b, capable of replacing power controller 14 in FIG. 1 according to embodiments of the invention.

FIG. 6 shows power controller 14b, capable of replacing power controller 14 in FIG. 1 according to embodiments of the invention. Power controller 14b could be a packaged integrated circuit with at least 4 pins respectively named as feedback FB, driving node DRV, current-sense node CS, and compensation node COM. Some aspects in power controller 14b are similar or the same with corresponding aspects in power controller 14a, and are self-explanatory in view of the aforementioned teaching of power controller 14a. Power controller 14b, however, has ON-time controller 224 and OFF-time controller 223 different from ON-time controller 124 and OFF-time controller 123 in power controller 14a.

Figure 7:
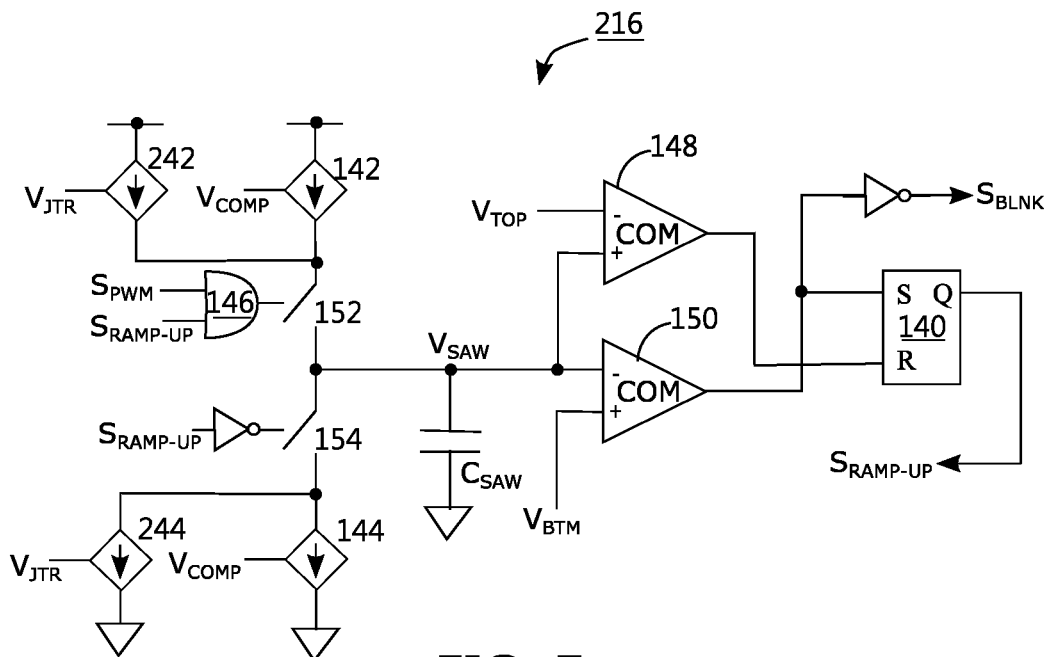
FIG. 7 illustrates blanking time generator 216.
Figure 8:
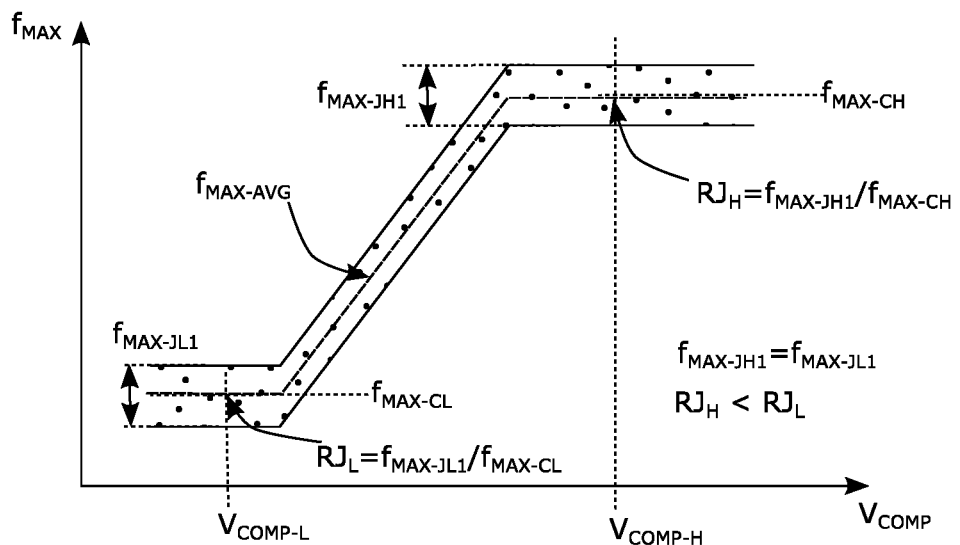
FIG. 8 shows the average switching frequency $f_{MAX\text{-}AVG}$ varying in response to compensation signal $V_{COMP}$ while frequency-variation range $f_{MAX\text{-}J}$ is a constant independent from compensation signal $V_{COMP}$.

OFF-time controller 223 differs from OFF-time 123 in blanking time generator 216, which is exemplified in FIG. 7. Several aspects in blanking time generator 216 of FIG. 7 are similar or the same with corresponding aspects in blanking time generator 116 of FIG. 4, and are self-explanatory in view of the aforementioned teaching regarding to FIG. 4. Blanking time generator 216 acts as a saw-wave generator, including comparator 148 making saw-wave $V_{SAW}$ on capacitor $C_{SAW}$ not more than top voltage $V_{TOP}$, and comparator 150 making saw-wave $V_{SAW}$ not less than bottom voltage $V_{BTM}$. As shown in FIG. 7, jitter signal $V_{JTR}$ controls controllable current sources 242 and 244 to provide secondary charge and discharge currents respectively, while compensation signal $V_{COMP}$ controls controllable current sources 142 and 144 to provide primary charge and discharge currents respectively. Secondary change and discharge currents are much smaller in comparison with primary charge and discharge currents. In other words, jitter signal $V_{JTR}$ jitters both charge current that flows into capacitor $C_{SAW}$, and discharge charge current that flows out from capacitor $C_{SAW}$. Controllable current sources 242 and 244 shown in FIG. 7 are not controlled by compensation signal $V_{COMP}$. According to embodiments of the invention, controllable current sources 142 and 144 are configured to make average switching frequency $f_{MAX-AVG}$ and compensation signal $V_{COMP}$ have a relationship between them shown in FIG. 8. FIG. 8 indicates that average switching frequency $f_{MAX-AVG}$ is $f_{MAX-CH}$, frequency-variation range $f_{MAX-J}$ $f_{MAX-JH1}$, variation ratio RJ $f_{MAX-JH1}/f_{MAX-CH}$, when compensation signal is equal to compensation value $V_{COMP-H}$. Also shown in FIG. 8 is that average switching frequency $f_{MAX-AVG}$ is $f_{MAX-CL}$, frequency-variation range $f_{MAX-J}$ $f_{MAX-JL1}$, variation ratio RJ $f_{MAX-JL1}/f_{MAX-CL}$, when compensation signal is equal to compensation value $V_{COMP-L}$. Average switching frequency $f_{MAX-CH}$ is higher than average switching frequency $f_{MAX-CL}$. Compensation value $V_{COMP-H}$ and compensation value $V_{COMP-L}$ correspond to relatively-heavy and relatively-light loads 13 respectively.

Frequency-variation range $f_{MAX-J}$ generated by blanking time generator 216 in FIG. 7 is about a constant independent from the change in compensation signal $V_{COMP}$. In other words, frequency-variation range $f_{MAX-JH1}$ is about the same with frequency-variation range $f_{MAX-JL1}$. Based on blanking time generator 216 in FIG. 7, equation IV in the following can be derived.

$$(I_M(V_{COMP})+I_J(V_{JTR}))*T_{BLNK}=CSAW*2*(V_{TOP}-V_{BTM}) \quad (IV),$$

where $I_M(V_{COMP})$ denotes the average current of controllable current sources 142 and 144, and $I_J(V_{JTR})$ the average current of controllable current sources 242 and 244. Frequency-variation range $f_{MAX-J}$ can be expressed therefore by the equation V below.

$$f_{MAX-J} = f_{MAX-H} - f_{MAX-L} = \quad (V)$$
$$(I_J(V_{JTR-MAX}) - I_J(V_{JTR-MIN}))/(CSAW*2*(V_{TOP-BTM})).$$

Frequency-variation range $f_{MAX-J}$, as indicated by equation V, only depends on $V_{JTR-MIN}$, $V_{JTR-MAX}$, CSAW, $V_{TOP}$, and $V_{BTM}$, all of which remain about constant inside jitter generator 114 and blanking time generator 216. Therefore, frequency-variation range $f_{MAX-J}$ provided by blanking time generator 216 is about a constant, independent from the change in compensation signal $V_{COMP}$. Even though average switching frequency $f_{MAX-CH}$ is higher than average switching frequency $f_{MAX-CL}$, frequency-variation range $f_{MAX-JH1}$ is about the same with frequency-variation range $f_{MAX-JL1}$.

Variation ratio RJ can be expressed by the following equation VI.

$$RJ = f_{MAX-J}/f_{MAX-AVG} = [I_J(V_{JTR-MAX}) - I_J(V_{JTR-MIN})] \quad (VI)$$
$$/(I_M(V_{COM}) + I_J(V_{JTR-AVG})),$$

where $V_{JTR-MAX}$, $V_{JTR-MIN}$ are $V_{JTR-AVG}$ are constant. Obviously from equation VI, variation ratio RJ increases if $I_m(V_{com})$ reduces. According to FIG. 8, in which average switching frequency $f_{MAX-CH}$ is higher than average switching frequency $f_{MAX-CL}$, $I_m(V_{COMP-H})$ is larger than $I_m(V_{COMP-L})$. Therefore, the $RJ_H$ when compensation signal $V_{COMP}$ is about compensation value $V_{COMP-H}$ is smaller than the $RJ_L$ when compensation signal $V_{COMP}$ is about compensation value $V_{COMP-L}$.

In comparison with ON-time controller 124 in FIG. 2, ON-time controller 224 in FIG. 6 additionally has adder 218 and multiplier 219. Multiplier 219 multiplies jitter signal $V_{JTR}$ by constant K, where constant K is larger than zero. Adder 218 deducts $K*V_{JTR}$ from current-sense signal $V_{CS}$, and sends the result to the non-invert input of comparator 122.

Figure 9:
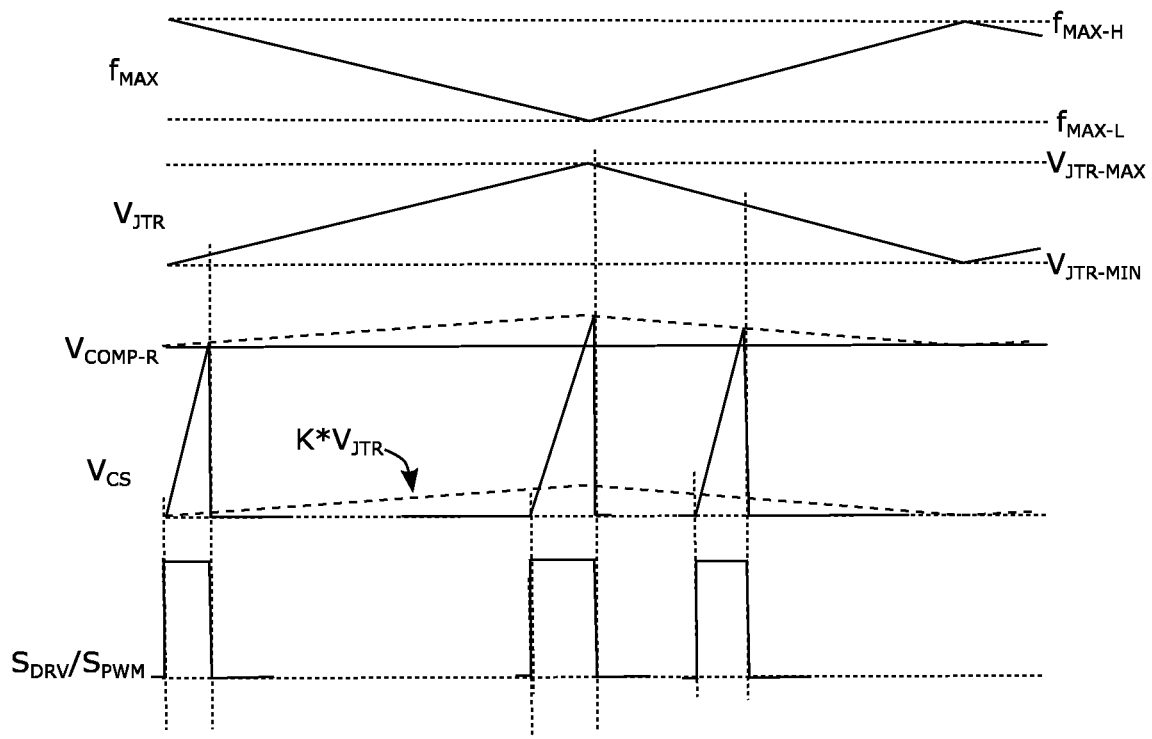
FIG. 9 demonstrates waveforms of maximum switching frequency $f_{MAX}$, jitter signal $V_{JTR}$, current-sense signal $V_{CS}$, and PWM signal $S_{DRV}/S_{PWM}$.

FIG. 9 demonstrates waveforms of maximum switching frequency $f_{MAX}$, jitter signal $V_{JTR}$, current-sense signal $V_{CS}$, and PWM signal $S_{DRV}/S_{PWM}$, to show the relationship therebetween. As shown in FIG. 9, when jitter signal $V_{JTR}$ increases, blanking time $T_{BLNK}$ increases, maximum switching frequency $f_{MAX}$ reduces, current-sense signal $V_{CS}$ need climb higher to compensate the deduction of $K*V_{JTR}$ provided by adder 218, and ON time $T_{ON}$ therefore increases. In other words, power controller 14b jitters maximum switching frequency $f_{MAX}$ and ON time $T_{ON}$ at the same time, but makes them have the opposite trends when jittered. Jitter signal $V_{JTR}$ increases/decreases maximum switching frequency $f_{MAX}$ slightly and, at the same time, decreases/increases ON time $T_{ON}$ slightly. From another point of view, jitter signal $V_{JTR}$ jitters ON time $T_{ON}$ and blanking time $T_{BLNK}$, making them both increased or decreased at the same time.

Figure 10:
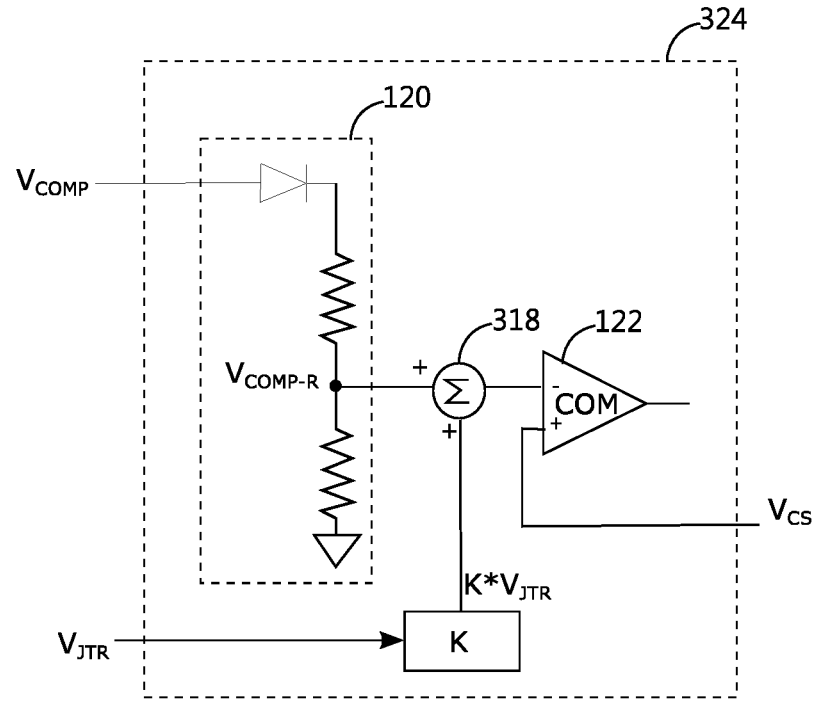
FIG. 10 demonstrates ON-time controller 324, capable of replacing ON-time controller 224 in FIG. 6 according to embodiments of the invention.

FIG. 10 demonstrates ON-time controller 324, capable of replacing ON-time controller 224 in FIG. 6 according to embodiments of the invention. Adder 318 in ON-time controller 324 adds compensation signal $V_{COMP-R}$ with $K*V_{JTR}$, and sends the result to the invert input of comparator 122. Theoretically, ON-time controller 324 is equivalent to ON-time controller 224, meaning that they operate to have the same or similar result.

Simulations have proved that power controller 14b, when replacing the power controller 14 in FIG. 1, can make switching mode power converter 10 operate in CCM or QR mode, in light of the condition of load 13. If load 13 is a constant and switching mode power converter 10 operates in QR mode, power controller 14b is capable of avoiding switching frequency $f_{SW}$ from staying around a single frequency, and makes it jump between three or more frequencies, thereby reducing or eliminating EMI issues as electromagnetic energy is spread out.

Jitter signal $V_{JTR}$ in FIG. 3B is an analog signal, but the invention is not limited to however. A jitter signal according to embodiments of the invention could be a digital count outputted from a counter, and this digital count recycles every 1/400 of a second.

Figure 11:
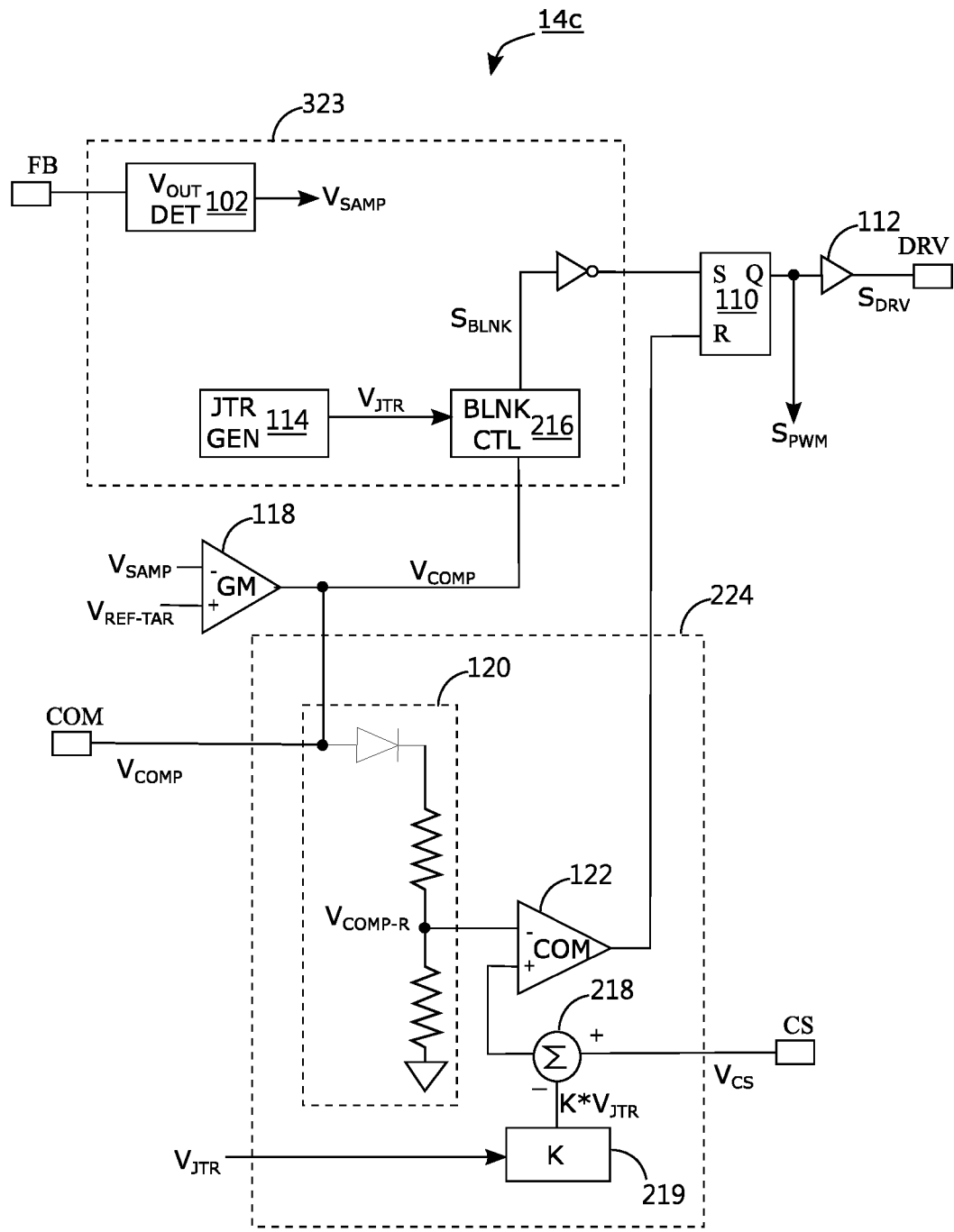
FIG. 11 shows power controller 14c capable of replacing power controller 14 in FIG. 1 according to embodiments of the invention.

Power controller 14b in FIG. 6 could operate switching mode power converter 10 in QR mode, but the invention is not limited to however. It is unnecessary for a power controller according to one embodiment of the invention to provide the ability of QR-mode operation. FIG. 11 shows power controller 14c capable of replacing power controller 14 in FIG. 1 according to embodiments of the invention. Power controller 14c might not provide valley switching or QR-mode operation.

OFF-time controller 323 in power controller 14c, in comparison with OFF-time controller 223 in power controller 14b, lacks valley detector 104 at least. According to the circuit connection shown in FIG. 11, blanking time generator 216 sets SR flip-flop 110 right after the end of blanking time $T_{BLNK}$, making both PWM signals $S_{PWM}$ and $S_{DRV}$ "1" in logic, turning ON power switch SW, ending OFF time $T_{OFF}$, and starting next ON time $T_{ON}$, regardless of whether voltage drop $V_{AUX}$ enters a voltage valley or not. In view of power controller 14c in FIG. 11, switching frequency $f_{SW}$ is about the same with maximum switching frequency $f_{MAX}$, the reciprocal of blanking time $T_{BLNK}$ defined by blanking time generator 216.

Power controller 14c could also provide the following features, including: 1) that frequency-variation range $f_{MAX-J}$ is a constant independent from the change in compensation signal $V_{COMP}$; 2) that the variation ratio RJ when compensation signal $V_{COMP}$ is compensation value $V_{COMP-H}$ is less than that when compensation signal $V_{COMP}$ is compensation value $V_{COMP-L}$; and 3) that jittering makes maximum switching frequency $f_{MAX}$ decreased at the same time when making ON time $T_{ON}$ increased.

This invention is not limited to that frequency-variation range $f_{MAX-J}$ is constant all the time, however. According to other embodiments of the invention, frequency-variation range $f_{MAX-J}$ might vary in response to the change in compensation signal $V_{COMP}$, and the variation ratio RJ when compensation signal $V_{COMP}$ is about compensation value $V_{COMP-H}$ is less than that when compensation signal $V_{COMP}$ is about compensation value $V_{COMP-L}$ less than compensation value $V_{COMP-H}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power converter for converting an input voltage into an output voltage to supply power to a load, the power converter comprising:
   an inductive device and a power switch, connected in series between the input voltage and an input ground; and
   a power controller providing a PWM signal to the power switch in response to a compensation signal to control the power switch, the compensation signal generated in response to the output voltage;
   wherein the power controller is configured to provide a maximum switching frequency limiting a switching frequency of the PWM signal;
   the power controller jitters the maximum switching frequency, making the maximum switching frequency have a first average switching frequency and a first variation ratio when the compensation signal is a first compensation value, and have a second average switching frequency and a second variation ratio when the compensation signal is a second compensation value;
   the first and second compensation values correspond to first and second loads respectively while the first load is heavier than the second load;
   the first average switching frequency is higher than the second average switching frequency;
   the second variation ratio is larger than the first variation ratio; and
   the PWM controller comprises:
      an ON-time controller controlling an ON time of the power switch in response to a current-sense signal and the compensation signal; and
      an OFF-time controller controlling an OFF time of the power switch in response to the compensation signal, comprising:
         a blanking-time generator generating a blanking signal in response to the compensation signal to define a blanking time, the OFF time controlled to end not earlier than an end of the blanking time; and
         a jitter generator providing a jitter signal to the blanking-time generator to jitter the blanking time;
         wherein the maximum switching frequency is in association with the blanking time.

2. The power converter as claimed in claim 1, wherein the maximum switching frequency has first and second variation ranges when the compensation signal is the first and second compensation values respectively, and the first and second variation ranges are substantially the same.

3. The power converter as claimed in claim 1, wherein the PWM signal defines an ON time and an OFF time of the power switch, and the power controller comprises:
   a jitter generator providing a jitter signal to jitter the maximum switching frequency and the ON time, the jitter signal making the maximum switching frequency decreased when making the ON time increased.

4. The power converter as claimed in claim 1, wherein the inductive device is a transformer with a primary winding, an auxiliary winding and a secondary winding, the power switch is connected in series with the primary winding between the input voltage and the input ground, and the power controller has a feedback node coupled to the auxiliary winding.

5. The power converter as claimed in claim 4, wherein the power controller detects a voltage drop across the auxiliary winding to perform valley switching.

6. A power controller in use of a power converter with an inductive device and a power switch, the power converter converting an input voltage into an output voltage, the power controller comprising:
   a compensation node for providing a compensation signal generated in response to the output voltage; and
   a PWM signal generator providing a PWM signal to the power switch in response to the compensation signal, the PWM signal generator configured to provide a maximum switching frequency limiting a switching frequency of the PWM signal;
   wherein the power controller jitters the maximum switching frequency, making the maximum switching frequency have a first average switching frequency and a first variation ratio when the compensation signal is a first compensation value, and have a second average switching frequency and a second variation ratio when the compensation signal is a second compensation value;
   the first average switching frequency is higher than the second average switching frequency;
   the second variation ratio is larger than the first variation ratio; and the PWM signal generator comprises:
an ON-time controller controlling an ON time of the power switch in response to a current-sense signal and the compensation signal; and
an OFF-time controller controlling an OFF time of the power switch in response to the compensation signal, comprising:
a blanking-time generator generating a blanking signal in response to the compensation signal to define a blanking time, the OFF time controlled to end not earlier than an end of the blanking time; and
a jitter generator providing a jitter signal to the blanking time generator to jitter the blanking time;
wherein the maximum switching frequency is in association with the blanking time.

7. The power controller as claimed in claim 6, wherein the blanking-time generator comprises:
a first controllable current source providing a primary current in response to the compensation signal to charge or discharge a capacitor; and
a second controllable current source jittering a secondary current in response to the jitter signal, the secondary current charging or discharging the capacitor.

8. The power controller as claimed in claim 7, wherein the second controllable current source is independent from the compensation signal.

9. The power controller as claimed in claim 6, wherein the jitter signal jitters the ON time, making both the ON time and the blanking time increased or decreased at the same time.

10. The power controller as claimed in claim 6, wherein the inductive device has an auxiliary winding, the power controller comprises a feedback node electrically coupled to the auxiliary winding, and the OFF-time controller comprises:
a valley detector coupled to the feedback node for detecting a voltage drop across the auxiliary winding to make the power switch perform valley switching.

11. A power controller in use of a power converter with an inductive device and a power switch, the power converter converting an input voltage into an output voltage, the power controller comprising:
a compensation node for providing a compensation signal generated in response to the output voltage; and
a PWM signal generator providing a PWM signal to the power switch in response to the compensation signal, the PWM signal having a switching frequency and defining an ON time and an OFF time of the power switch, the PWM signal generator configured to provide a maximum switching frequency making the switching frequency not more than the maximum switching frequency;
wherein the PWM signal generator jitters the maximum switching frequency and the ON time when the compensation signal is a first compensation value, so as to make the maximum switching frequency decreased when making the ON time increased; and
the PWM signal generator comprises:
an ON-time controller controlling the ON time in response to a current-sense signal and the compensation signal; and
an OFF-time controller controlling the OFF time in response to the compensation signal, comprising:
a blanking-time generator generating a blanking signal in response to the compensation signal to define a blanking time, the OFF time controlled to end not earlier than an end of the blanking time; and
a jitter generator providing a jitter signal to the blanking time generator to jitter the blanking time;
wherein the maximum switching frequency is in association with the blanking time.

12. The power controller as claimed in claim 11, wherein:
the PWM signal generator jitters the maximum switching frequency, making the maximum switching frequency have a first average switching frequency and a first variation ratio when the compensation signal is the first compensation value, and have a second average switching frequency and a second variation ratio when the compensation signal is a second compensation value;
the first average switching frequency is higher than the second average switching frequency; and
the second variation ratio is larger than the first variation ratio.

13. The power controller as claimed in claim 12, wherein the maximum switching frequency has first and second variation ranges when compensation signal is the first and second compensation values respectively, and the first and second variation ranges are substantially the same.

* * * * *